(12) United States Patent
Szabo et al.

(10) Patent No.: US 12,042,927 B2
(45) Date of Patent: Jul. 23, 2024

(54) TECHNIQUE FOR CONTROLLING WIRELESS COMMAND TRANSMISSION TO A ROBOTIC DEVICE

(71) Applicant: Telefonaktiebolaget LM Ericsson (publ), Stockholm (SE)

(72) Inventors: Geza Szabo, Kecskemet (HU); Rafael Roque Aschoff, Recife (BR); Sándor Rácz, Cegléd (HU); Norbert Reider, Tényő (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1041 days.

(21) Appl. No.: 16/962,864

(22) PCT Filed: Jun. 11, 2018

(86) PCT No.: PCT/EP2018/065388
§ 371 (c)(1),
(2) Date: Jul. 17, 2020

(87) PCT Pub. No.: WO2019/238215
PCT Pub. Date: Dec. 19, 2019

(65) Prior Publication Data
US 2020/0346353 A1  Nov. 5, 2020

(51) Int. Cl.
*B25J 13/00* (2006.01)
*G05B 19/4155* (2006.01)

(52) U.S. Cl.
CPC ........ *B25J 13/006* (2013.01); *G05B 19/4155* (2013.01); *G05B 2219/31076* (2013.01); *G05B 2219/31087* (2013.01); *G05B 2219/42033* (2013.01); *G05B 2219/50391* (2013.01)

(58) Field of Classification Search
None
See application file for complete search history.

(56) References Cited

U.S. PATENT DOCUMENTS

| 8,947,522 B1 | 2/2015 | Hickman et al. |
| 9,144,907 B2 | 9/2015 | Summer et al. |
| 2015/0078200 A1 | 3/2015 | Kalkunte et al. |
| 2015/0120048 A1* | 4/2015 | Summer ............... B25J 9/1692 700/254 |
| 2017/0308052 A1* | 10/2017 | Kajiyama ............ G05B 19/402 |
| 2018/0096257 A1* | 4/2018 | Lucarelli ............ G05B 19/4155 |

(Continued)

OTHER PUBLICATIONS

PCT International Search Report and Written Opinion mailed Feb. 20, 2019 for International Application PCT/EP2018/065388, 10 pages.

(Continued)

*Primary Examiner* — Srinivasa R Reddivalam
(74) *Attorney, Agent, or Firm* — Sage Patent Group (57) ABSTRACT

A controller for controlling wireless command transmission to a robotic device is described. The controller is configured to obtain an action that is to be performed by a robotic device and to determine a quality of control, QoC, level that is associated with the action. The controller is further configured to trigger a setting of at least one transmission parameter for a wireless transmission of a command pertaining to the action. The transmission parameter setting is dependent on the QoC level determined for the action.

16 Claims, 5 Drawing Sheets

(56) References Cited

U.S. PATENT DOCUMENTS

2018/0264649 A1* 9/2018 Ojima .................. B25J 9/1669

OTHER PUBLICATIONS

Hu, Ben et al., "Cloudroid: A Cloud Framework for Transparent and QoS-aware Robotic Computation Outsourcing", Cornell University Library, Ithaca, NY, May 16, 2017, 8 pages, XP080948253.

Li, Yiying et al., "Toward QoS-Aware Cloud Robotic Applications: A Hybrid Architecture and Its Implementation", 2016 Intl IEEE Conferences on Ubiquitous Intelligence & Computing, Advanced and Trusted Computing, Scalable Computing and Communications, Cloud and Big Data Computing, Internet of People, and Smart World Congress, Toulouse, France, Jan. 12, 2017, 8 pages, XP033043052.

Biggs, Geoffrey et al., "A Survey of Robot Programming Systems", in Proceedings of the Australasian Conference on Robotics and Automation, CSIRO, 2003, 10 pages.

Nordmann, Arne et al., "A Survey on Domain-Specific Languages in Robotics", Proceedings of the 4th International Conference on Simulation, Modeling, and Programming for Autonomous Robots—vol. 8810, Oct. 2014, 12 pages.

Mohamed, Nader et al., "A Review of Middleware for Networked Robots", IJCSNS International Journal of Computer Science and Network Security, vol. 9 No. 5, May 2009, pp. 139-148.

Elkady, Ayssam et al., "Robotics Middleware: A Comprehensive Literature Survey and Attribute-Based Bibliography", Hindawi Publishing Corporation, Journal of Robotics, vol. 2012, Jan. 29, 2012, 15 pages.

3GPP; Technical Specification Group Services and System Aspects; System Architecture for the 5G System; Stage 2; (Release 15), 3GPP TS 23.501 V0.0.0 (Jan. 2017), Valbonne, France, 14 pages.

* cited by examiner

TECHNIQUE FOR CONTROLLING WIRELESS COMMAND TRANSMISSION TO A ROBOTIC DEVICE

CROSS-REFERENCE TO RELATED APPLICATIONS

This application is a 35 U.S.C. § 371 national stage application for International Application No. PCT/EP2018/065388, entitled "TECHNIQUE FOR CONTROLLING WIRELESS COMMAND TRANSMISSION TO A ROBOTIC DEVICE", filed on Jun. 11, 2018, the disclosures and contents of which are hereby incorporated by reference in their entireties.

TECHNICAL FIELD

The present disclosure generally relates to industrial automation. In particular, a technique for controlling wireless command transmission to a robotic device is presented. The technique may be implemented in the form of a controller, a method, a computer program product and a computing cloud system.

BACKGROUND

In industrial automation, there are considerations to build robot cells from multiple robotic devices (such as collaborative robot arms) and to control these robot cells from a remote site. The remote control functionalities are, for example, deployed in a computing cloud, and control commands generated in the computing cloud are wirelessly transmitted to the robotic devices in the robot cells.

Existing communication protocols for industrial automation (e.g., EtherCAT or ProfiNet) have been developed for local cell control where the controller is placed in the robot cell and connected to the robotic devices via wire-based field buses. These protocols assume that the communication between the local controller and the robotic devices is reliable and has no substantial delay, which is a valid assumption when field buses connect the robotic devices with their controller.

Field buses thus provide a comparatively deterministic behaviour with low command transmission delay and are not impacted by the challenges and uncertainties of wireless command transmission, including packet loss, jitter, wireless spectrum availability, re-transmission delay, and proper resource allocation. As such, wireless command transmission negatively impacts the deterministic behaviour of robot cell control compared to wire-based solutions. To minimize this negative impact, one may think of using wireless transmission settings that guarantee a constantly high Quality of Service (QoS) for wireless command transmission. Evidently, such settings will tend to maximize wireless resource usage.

SUMMARY

There is a need for a technique of controlling wireless command transmission to robotic devices that permits to cope with the uncertainties of wireless transmission channels while optimizing wireless resource usage.

According to a first aspect, a controller for controlling wireless command transmission to a robotic device is provided. The controller is configured to obtain an action that is to be performed by a robotic device, to determine a quality of control, QoC, level associated with the obtained action, and to trigger a setting of at least one transmission parameter for a wireless transmission of a command pertaining to the action, wherein the setting is dependent on the QoC level determined for the action.

In certain variants, the transmission parameter setting for transmission of an individual command can temporarily relax QoS requirements for a wireless transmission channel dependent on the QoC level associated with the corresponding action. As such, wireless resource usage can be optimized in dependence on the command that currently needs to be transmitted to the robotic device. In this manner, the technical insight is exploited that different actions permit the usage of different transmission parameter settings. In exemplary realizations, the transmission parameter setting strategy implements a QoC level-based wireless resource allocation for command transmission.

The controller may be configured to determine a control tolerance setting for the robotic device dependent on at least one of the action, the associated QoC level, the associated command and the associated transmission parameter setting. The control tolerance setting may pertain to a feedback-based control loop. The controller may trigger application of the determined control tolerance setting for execution of the command.

In some variants the command relates to a movement of the robotic device. The control tolerance setting may thus relate to a control tolerance of at least one of a movement goal path (i.e., a target path) a movement goal position (i.e., a target position) and a movement goal time (i.e., a target time when the movement position is to be reached).

The control tolerance setting may influence an inverse kinematics-based control of the robotic device. Of course, the robotic device could alternatively be controlled using direct kinematics.

A proportional-integral-derivative (PID) control loop may be provided for the robotic device. In such a case, the control tolerance setting may be configured to influence the PID control loop. One or more parameters of the PID control loop may be controlled dependent on at least one of the control tolerance setting and the QoC level determined for the action. PID control may, for example, pertain to velocity of a movement of a robotic device.

The control tolerance setting determined for execution of the command may belong to one of multiple control tolerance settings. In a similar manner, the determined QoC level may belong to one of multiple QoC levels. In such an implementation, a control tolerance setting pertaining to a higher control tolerance may be associated with a QoC level pertaining to a lower QoC, and vice versa.

The QoC level may generally be indicative of a key performance indicator (KPI) requirement for execution of the associated command by the robotic device (e.g., for a movement of the robotic device). In this regard, a QoC level associated with a higher QoC may be associated with a higher KPI requirement, and vice versa. As such, the obtained command may belong to at least one of multiple QoC levels associated with different KPI requirement levels for the robotic device. Exemplary KPI requirements include movement accuracy (e.g., in regard to a target position or a target path), movement speed, and so on.

The setting of the at least one transmission parameter may be defined by at least one of an associated transmission resource consumption level and an associated QoS level of a wireless transmission channel. The QoS level may, for example, pertain to QoS control at a service data flow level, at a QoS flow level, or at a packet data unit session level (see, e.g., section 4.3.3 of $3^{rd}$ Generation Partnership Project (3GPP) Technical Specification (TS) 23.503 V15.1.0 (2018-03)). A KPI requirement level pertaining to a lower KPI requirement may correspond to at least one of a lower transmission resource consumption level and a lower QoS level, and vice versa.

The robotic device may comprise a robot arm. The action and, thus, the command may relate to a movement of the robot arm. As such, the command may result in a specific movement action of the robot arm. The robot arm may comprise multiple independently actuatable joints. In such a case, the command may comprise two or more sub-commands for actuation of different ones of the actuatable joints.

The controller may be implemented using cloud computing resources. The controller may thus be realized in a could computing domain. The cloud computing domain, in turn, may communicatively be coupled to a wireless access domain for wireless command transmission towards a robot cell domain.

In some implementations, the transmission parameter setting may be based on QoS control in accordance with 3GPP TS 23.501 (see, e.g., section 4.3 of V15.1.0 (2018-03)). Of course, other QoS control mechanisms for wireless transmission channels could be implemented as well.

According to a second aspect, a method of controlling wireless command transmission to a robotic device is provided. The method comprises obtaining an action that is to be performed by a robotic device, determining a QoC level associated with the action, and triggering a setting of at least one transmission parameter for a wireless transmission of a command pertaining to the action, wherein the setting is dependent on the QoC level determined for the action.

The method presented therein may be performed by a controller as generally described above and as described below in more detail.

Also provided is a computer program product comprising program code portions for performing the steps of any of the method aspects presented herein when executed by one or more processors. The computer program product may be stored on a computer-readable recording medium. The computer program product may also be provided for download via a network connection.

Also presented is a cloud computing system configured to perform any of the method aspects presented herein. The cloud computing system may comprise distributed cloud computing resources that jointly perform the method aspects presented herein under control of one or more computer program products.

According to a still further aspect, a controller for controlling command execution by a robotic device is provided. The controller is configured to obtain an action that is to be performed by a robotic device, to determine a quality of control, QoC, level associated with the obtained action, and to trigger a setting of at least one control parameter for execution of a command pertaining to the action, wherein the setting is dependent on the QoC level determined for the action and wherein the control parameter is configured to control a feedback loop that optionally includes a wireless transmission of the command and/or a feedback parameter.

The feedback loop may belong to a PID-based control strategy, wherein also a subset of PID control parameters (e.g., only P and I, only D, etc.) can be implemented according to the present disclosure. As such, the control parameter can comprise only on or more of a P parameter, an I parameter and a D parameter. Alternatively, or in addition, the control parameter may comprise a parameter defining a control tolerance setting, as generally explained herein.

BRIEF DESCRIPTION OF THE DRAWINGS

Further aspects, details and advantages of the present disclosure will become apparent from the detailed description of exemplary embodiments below and from the drawings, wherein.

DETAILED DESCRIPTION

In the following description, for purposes of explanation and not limitation, specific details are set forth in order to provide a thorough understanding of the present disclosure. It will be apparent to one skilled in the art that the present disclosure may be practiced in other embodiments that depart from these specific details.

While, for example, the following description focuses on specific radio access network types such as $5^{th}$ Generation (5G) networks, the present disclosure can also be implemented in connection with other radio access network types. Moreover, while certain aspects in the following description will exemplarily be described in connection with cellular networks, particularly as standardized by 3GPP, the present disclosure is not restricted to any specific wireless access type.

Those skilled in the art will further appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

In the following description of exemplary embodiments, the same reference numerals denote the same or similar components.

Figure 1A:
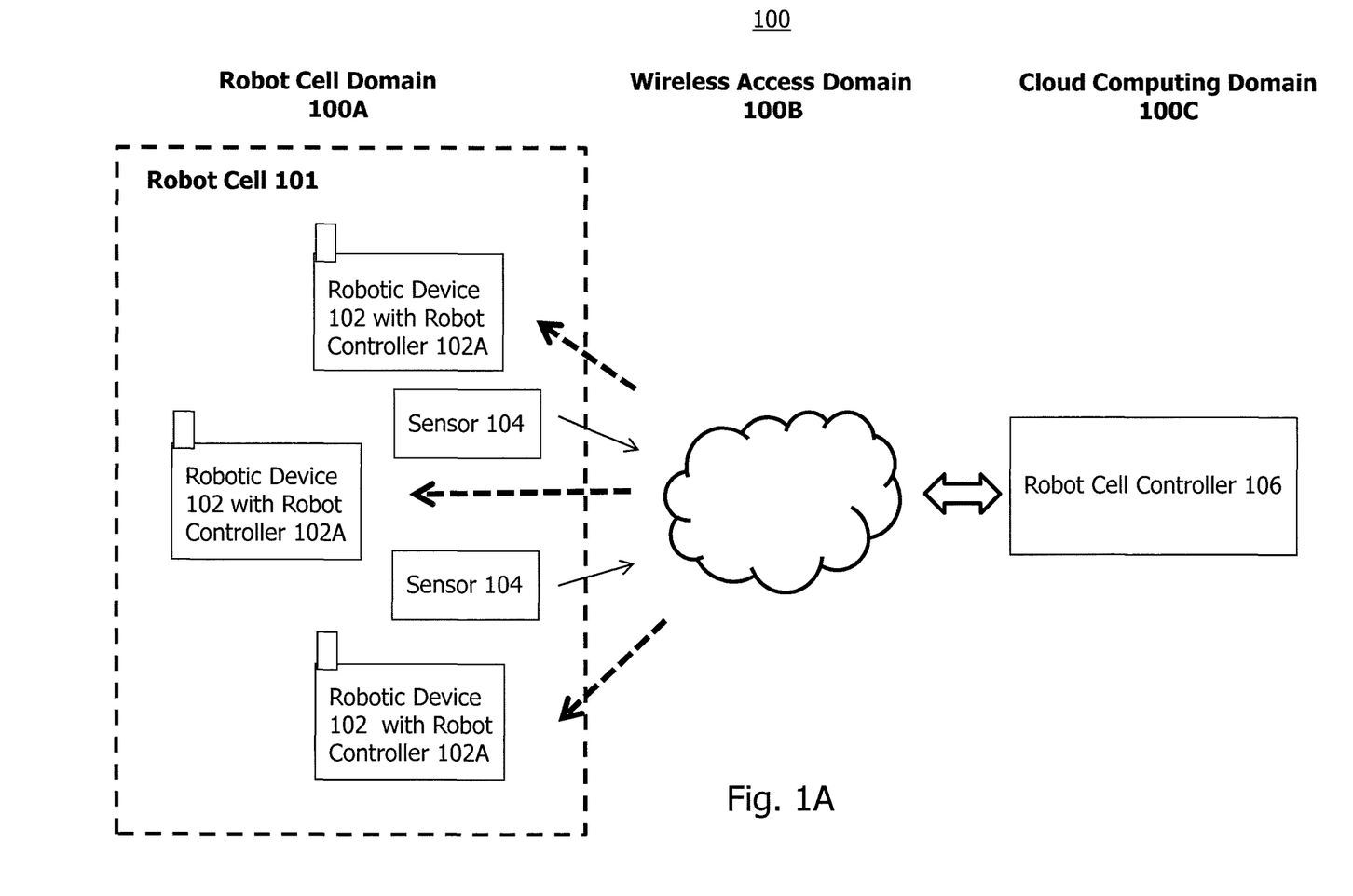
FIGS. 1A & B illustrate network system embodiments of the present disclosure.

FIG. 1A illustrates an embodiment of a network system 100 for computing cloud-based robot cell control. As shown in FIG. 1A, the network system 100 comprises a robot cell domain 100A, a wireless access domain 100B as well as a cloud computing domain 100C.

The robot cell domain 100A comprises at least one robot cell 101 with multiple robotic devices 102 each having a dedicated robot controller 102A in association therewith. The robotic devices 102 can comprise various actuators such as robot arms movable within various degrees of freedom. The various robotic devices 102 within the robot cell 101 may collaboratively work on the same task (e.g., on the same work product).

The robot cell domain 100A further comprises multiple sensors 104 such as cameras, position sensors, orientation sensors, angle sensors, and so on. The sensors 104 generate sensor data indicative of a state of the robot cell 101 (i.e., cell state data). The sensors 104 can be freely distributed in the robot cell 101. One or more of the sensors 104 can also be integrated into one or more of the robotic devices 102.

The wireless access domain 100B may be a cellular or non-cellular network, such as a cellular network specified by 3GPP. In some implementations, the wireless access domain 100B may be compliant with the 3GPP standards according to Release R15, such as TS 23.503 V15.1.0 (2018-3) or later. The wireless access domain 100B may comprise a base station or a wireless access point (not shown) that enables a wireless communication between components of the robot cell 101 on the one hand and the cloud computing domain 100C on the other via the wireless access domain 100B.

As illustrated in FIG. 1A, the robotic devices 102 with their associated robot controllers 102A are configured to receive control commands generated in the cloud computing domain 100C via wireless transmissions from the wireless access domain 100B. Moreover, the sensor data as acquired by the sensors 104 are wirelessly communicated via the wireless access domain 100B to the cloud computing domain 100C to inform same about the state of the robot cell 101. Processing of the sensor data (e.g., in the context of inverse kinematics) at least partially takes place in the cloud computing domain 100C. The processed sensor data may then form the basis for control command generation in the computing cloud domain 100C. Additionally, or in the alternative, control command generation in the cloud computing domain 100C is based on actions defined in an action plan for one or more of the robotic devices 102.

The cloud computing domain 100C comprises a robot cell controller 106 composed of could computing resources. The robot cell controller 106 is configured to receive the sensor data (i.e., cell state data) from the sensors 104 via the wireless access domain 100B. The robot cell controller 106 is further configured to generate control commands for the robotic devices 102, optionally on the basis of the sensor data, and to forward the control commands via the wireless access domain 100B to the robot controllers 102A of the robotic devices 102. The robot controllers 102A are configured to wirelessly receive the control commands and to control one or more individual actuators of the respective robotic device 102 based thereon.

Figure 1B:
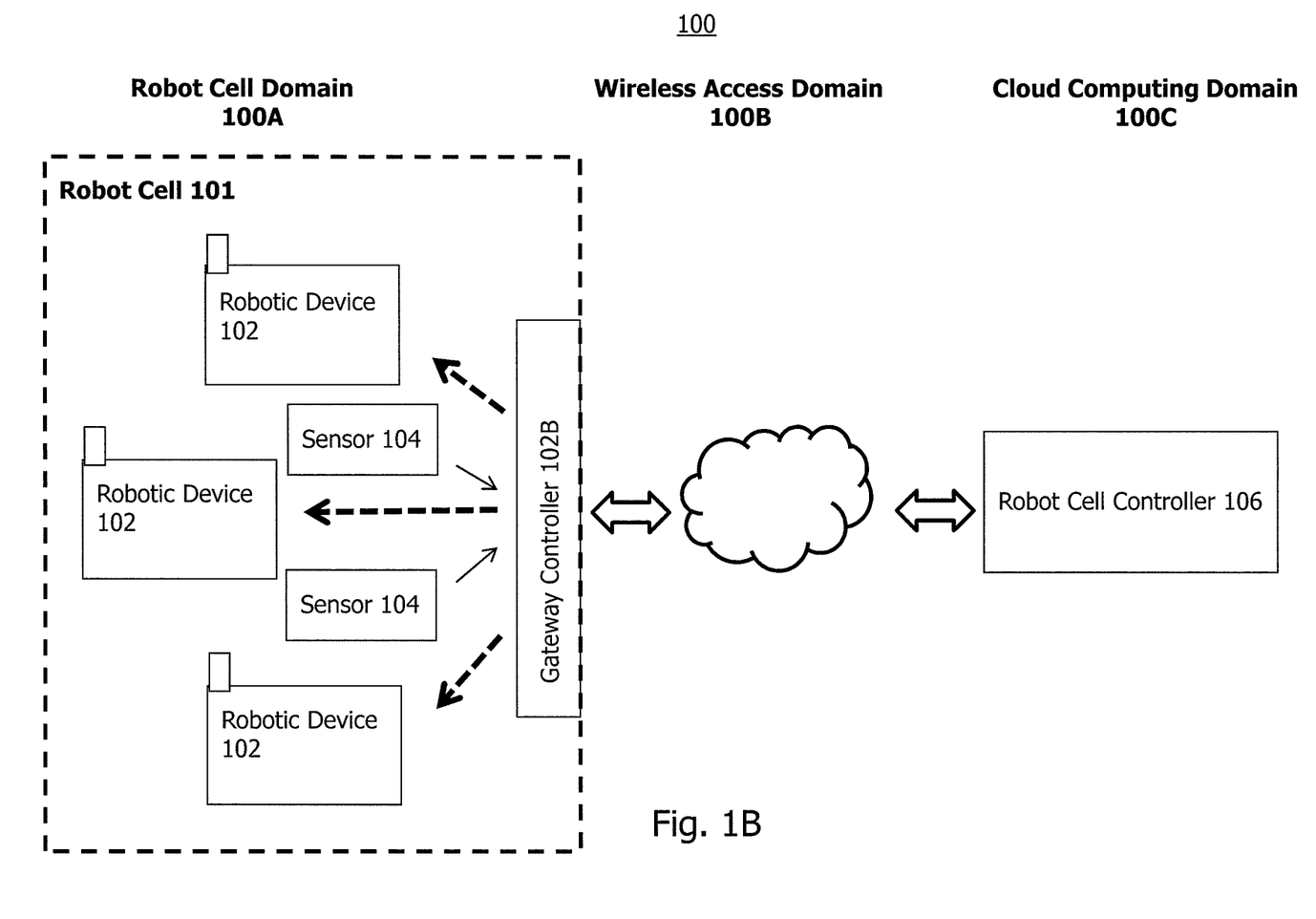

FIG. 1B illustrates an embodiment of a further network system 100 similar to the one shown in FIG. 1A. In the network system 100 of FIG. 1B, the local robot controllers 102A of FIG. 1A are replaced by a central gateway controller 102B. This gateway controller 102B is configured to wirelessly receive the control commands from the wireless access domain 100B and to control one or more individual actuators of each of the robotic devices 102 in the robot cell 101 based thereon. The connections between the gateway controller 102B and the robotic devices 102 may be wire-based (e.g., based on field buses). Using a central gateway controller 102B, a synchronous control of interworking robotic devices 102 becomes easier. The gateway controller 102B also collects the sensor data from the sensors 104 and wirelessly transmits same to the computing cloud domain 100C. The connections between the gateway controller 102B and the sensors 104 may be wire-based (e.g., based on field buses).

The network embodiments illustrated in FIGS. 1A and 1B can be combined in various ways. For example, each robotic device 102 may comprise an associated robot controller 102A as illustrated in FIG. 1A, and the robot controllers 102A may be attached to the gateway controller 102B of FIG. 1B using wire-based connections (e.g., field buses).

Figure 2A:
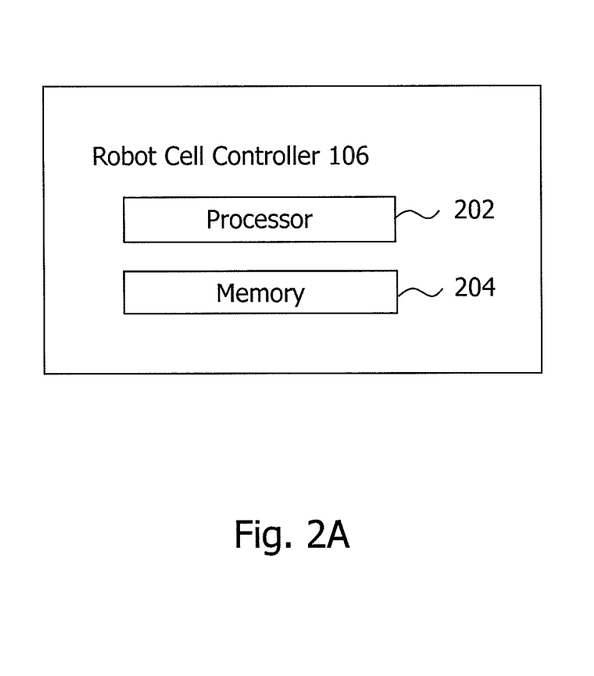
FIGS. 2A & B illustrate controller embodiments of the present disclosure.
Figure 2B:
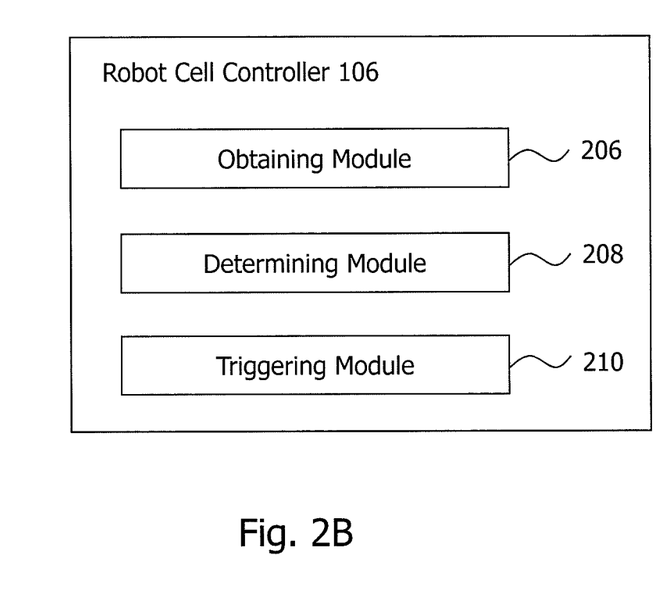

FIGS. 2A and 2B illustrate two embodiments of the computing cloud-based robot cell controller 106 of FIGS. 1A and 1B. In the embodiment illustrated in FIG. 2A, the cloud-based robot cell controller 106 comprises a processor 202 and a memory 204 coupled to the processor 202. Optionally, the controller 106 further comprises one or more interfaces for communication with other components of the network system 100 of FIGS. 1A and 1B, in particular with the wireless access domain 100B.

The processor 202 is configured to obtain an action that is to be performed by one of the robotic devices 102 illustrated in FIGS. 1A and 1B, to determine a QoC level associated with the obtained action, and to trigger a setting of at least one transmission parameter for a wireless transmission of a command targeted at performing the obtained action via the wireless access domain 100B. The transmission parameter setting is dependent on the QoC level determined for the action associated with the command.

FIG. 2B shows an embodiment in which the computing cloud-based robot cell controller 106 is implemented in a modular configuration. As shown in FIG. 2B, the controller 106 comprises a obtaining module 206 configured to obtain an action that is to be performed by one of the robotic devices 102 and a determining module 208 configured to determine a QoC level associated with the obtained action. The controller 106 further comprises a triggering module 210 configured to trigger a setting of at least one transmission parameter for a wireless transmission of a command corresponding to the obtained action, wherein the setting is dependent on QoC level determined for the action.

Figure 3:
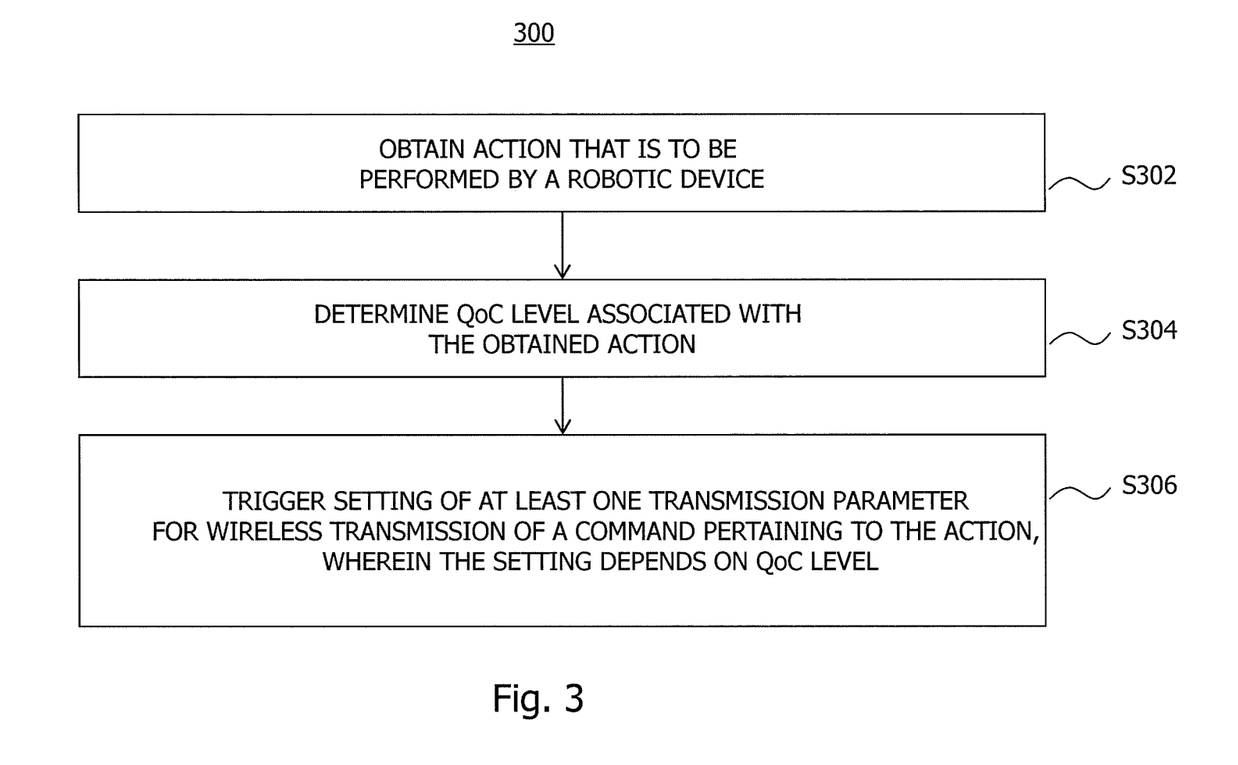
FIG. 3 illustrates a method embodiment of the present disclosure.

FIG. 3 illustrates in a flow diagram 300 a method embodiment of controlling wireless command transmission to a robotic de device 102. The method embodiment may be performed by any of the controllers 106 of FIG. 2A or 2B, or by a controller having a different configuration.

In step S302, the controller 106 obtains an action that is to be performed by one of the robotic devices 102 within the robot cell 101 of FIGS. 1A and 1B. The action may be obtained within the cloud computing domain 100C from an order or an action plan associated with one or more of the robotic devices 102. Alternatively, or in addition, the action may be obtained based on an evaluation of sensor data received from the sensors 104 in the robot cell 101 (e.g., in the context of inverse kinematics). Still further, the action may directly be obtained as a command that is to be wirelessly transmitted to one of the robotic devices 102.

The action obtained in step S302 may be associated with a specific movement that needs to be performed by a specific robotic device 102 in the robot cell 101. Depending on the nature of the robotic device 102, this movement may, for example, be a movement of a robotic arm or a movement of a gripper of the robotic arm.

In a further step S304, a QoC level associated with the action obtained in step S302 is determined. There may exist multiple predefined QoC levels, wherein each QoC is, for example, indicative of an accuracy requirement or other KPI requirement associated with execution of a specific action (e.g., a movement) of one of the robotic devices 102. In such an implementation, different QoC levels may be associated with different KPI requirement levels as now will now be explained in more detail with exemplary reference to a robotic device 102 in the form of a robot arm.

A robot arm may comprise multiple joints that define individual degrees of freedom for robot arm movement. As understood herein, a control command may pertain to the robot arm as a whole (and may thus comprise multiple sub-commands for the individual joint actuators), or it may pertain to an individual joint actuator of a multi-joint robot arm. A control command pertaining to a robot arm movement may thus result in an action corresponding to a particular robot arm movement.

There are robot arm movements not requiring a high QoC and, thus, permitting to a certain extent to lower QoC. In the following, an exemplary two-level QoC scenario will be described (high/low QoC). It will be appreciated that the actions, and the associated movements, could also be categorized into three or more QoC levels.

Actions associated with low QoC do not significantly influence the final performance of the robot cell 101. Their execution speed (in terms of movement velocity) is important, so they should be fast, but they need not be accurate and can tolerate a certain overshooting upon execution. In this regard, the following arm control commands and associated actions can be mentioned:
- go to initial position: move the arm to its initial position
- go to tray position: move the arm to a static position in front of a tray
- go to belt start: move to the arm to a static position in front of a start of a belt
- go to belt: move the arm to a static position in front of a belt
- go to part bin front: move the arm in front of a desired part
- go to bin front: move the arm in front of a desired bin
- move side ways: move arm along side the belt There are other actions and associated arm movements requiring high QoC. These actions have a high impact on the final performance of the robot cell 101 as a whole and have to be precise. In this regard, the following arm control commands and associated actions can be mentioned:
- go to position a bit above part: move the arm to a position a little bit above a part
- go down until get piece: the arm approaches the part to be picked until it is reached
- turn wrist: turn the wrist joint of the robot arm, required for example to turn the part upside down
- move tool tip: movement of tool center point (TCP) in Cartesian space
- move tool tip ZY: movement of TCP in Cartesian space keeping one dimension fixed A mapping between actions and QoC levels (i.e., the categorization of actions in regard to their QoC level or the associated tagging of actions) as exemplarily described above may be predefined and stored in a database in the cloud computing domain 100C. Based on such a mapping, the action obtained in step S302 will be categorized in step S304 to determine the associated QoC level. The mapping may be generated based on one or more KPIs associated with the individual actions. As mentioned above, there exist actions for which a KPI can deteriorate compared to other actions without any negative impact on the performance of the robot cell 101 as a whole.

In case the action obtained in step S302 is not the command as such, the controller 106 also determines at least one command associated with the action. This determination could be performed independently from step S304.

The method then continues with step S306. In step S306, the controller 106 triggers a setting of at least one transmission parameter for wireless command transmission in dependence on the QoC level that was determined in step S304. To this end, the controller 106 communicates with a controller in the wireless access domain 100B (e.g., a controller integrated into a base station) to suitably set one or more transmission parameters for wireless transmission of the command towards the robot cell domain 100A.

As a result, the wireless access domain 100B may configure a wireless transmission channel for command transmission to assume a dedicated QoS level representative of the transmission parameter setting. In case the command is associated with a low QoC level, a low QoS level may be selected to save wireless transmission resources compared to a high QoS level command. Transmission resource requirements may thus temporarily be relaxed for commands not associated with the highest QoC level. This relaxation will not have any effect on robot cell performance as a whole because high QoC level actions will still be transmitted using a transmission channel providing a high QoS.

The command may wirelessly be transmitted in one or more data packets with standardized QoS marking information to inform QoS enforcement functions in the wireless access domain 100B which QoS needs to be enforced. As such, separate QoS signaling is not necessary.

In the following, a further embodiment of a network system 100 will be described with reference to FIG. 4. As explained above, the same reference numerals as in FIGS. 1A and 1B will denote the same or similar components.

Figure 4:
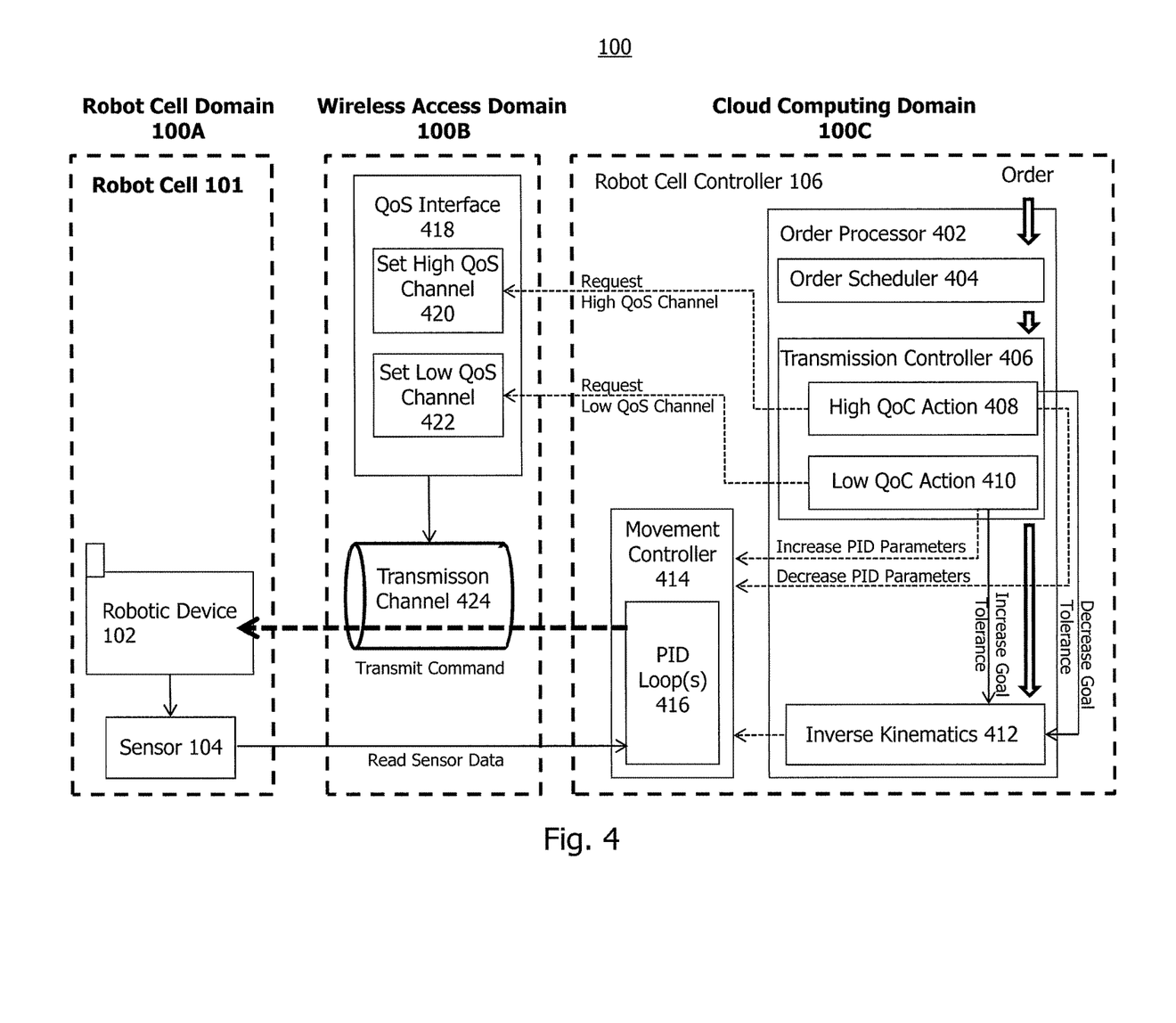
FIG. 4 illustrates a further network system embodiment of the present disclosure with associated control aspects.

As shown in FIG. 4, the robot cell controller 106 in the cloud computing domain 100C comprises an order processor 402 configured to receive orders to be implemented by one or more robotic devices 102 in the robot cell 101. The orders may comprise a series of one or more actions to be taken by one or more robotic devices 102 in the robot cell domain 100A. Based on the one or more actions defined in an order, the robot cell controller 106 generates one on or more associated control commands for a particular robotic device 102. As such, the control commands will typically be different from the actions as defined in the orders, but there will exist a correspondence between actions on the one hand and control commands on the other hand.

The order processor 402 comprises an order scheduler 404 configured to coordinate scheduling of the orders (and of the actions contained therein) for transmission towards the robot cell domain 100A. Moreover, the order processor 402 comprises a transmission controller 406 configured to control wireless command transmission by triggering QoC-dependent transmission parameter settings in the wireless access domain 100B. In the present, exemplary embodiment, it will be assumed that each action contained in the orders received by the transmission controller 406 can be categorized into either a high QoC action 408 or a low QoC action 410.

The order processor 402 further comprises an inverse kinematics component 412. The inverse kinematics component 412 is in charge of performing an inverse kinematics-based control of the one or more robotic devices 102 in the robot cell 101. This control may at least partially be based on sensor data gathered by one or more of the sensors 104 that monitor movements and states of the one or more robotic devices 102 in the robot cell 101.

The robot cell controller 106 further comprises a movement controller 414 configured to generate commands corresponding to the actions as received by the order processor 402 and to send the generated commands via the wireless access domain 100B towards the robot cell 101. For instance, one action could be a robot arm movement along a trajectory from A to B, which movement is translated by the movement controller 414 into one or more control commands for locally controlling one or more robot arm joint actuators to execute the trajectory from A to B. As an example, one command may relate to exactly one actuator of one robotic device 102.

The movement controller 414 is configured to maintain one or more PID loops 416 for controlling execution of the commands. Thus, the movement controller 414 is configured to control the one or more robotic devices 102 in accordance with a PID-based control strategy. In this regard, a feedback loop including the movement controller 414, an individual robotic device 102 and one or more sensors 104 returning sensor data pertaining to the robotic device 102 to be controlled is established. The control frequency and/or command transmission frequency may be in the order of 50 to 500 kHz.

The wireless access domain 100B comprises a QoS interface 418 that is configured to enforce the transmission parameter setting triggered (e.g., requested) by the robot cell controller 106. The QoS interface 118 may be implemented in a base station serving the robot cell 101 with the one or more robotic devices 102 and the one or more sensors 104.

As illustrated in FIG. 4, the QoS interface 418 is in particular configured to selectively implement one of a first transmission parameter setting associated with a high QoS channel (function 420) and a second transmission parameter setting associated with a low QoS channel (function 422). In this manner, a suitable transmission channel 424 for triggering either a high QoC action 408 in the robot cell 101 (via the high QoS channel setting function 420) or a low QoC action (via the low QoS channel setting function 422) can be selected.

If the transmission controller 406 determines that a command that is about to be dispatched to the robotic device 102 pertains to a high QoC action 408, it will request a high QoS channel 424 from the QoS interface 418. In a similar manner, when the transmission controller 406 determines that the command about to be dispatched is associated with a low QoC action 410, it will request the QoS interface 418 that the associated command is transmitted via a low QoS channel 424.

Using a low QoS channel 424 for command transmission may introduce a control delay (i.e., latency) in regard to the robotic device 102 to be controlled. This control delay, in turn, may be lead to an error condition in the movement controller 414. The movement controller 414 may thus stop the robotic device 102 during execution of a planned trajectory associated with a low QoC action 410 because an increased latency generally also increases a deviance from the planned trajectory.

Stopping the robotic device 102 in such as case is, of course, unwanted and has to be avoided. In the following, various variants for avoiding such unwanted error conditions in case of a control delay intentionally introduced by a particular transmission parameter setting will be discussed.

According to one variant, a control tolerance setting for the robotic device 102 is set dependent on the QoC level associated with a specific action or the corresponding command. To this end, as shown in FIG. 4, a goal tolerance setting may be increased in regard to the inverse kinematics component 412 in case of a low QoC action 410. Additionally, or as an alternative, the goal tolerance setting may be decreased in case of a high QoC action 408. The goal tolerance setting may generally relate to one or more of a movement goal path, a movement goal position and a movement goal time associated with execution of a specific command by the robotic device 102. A specific control tolerance setting triggered by the transmission controller 406 in regard to the inverse kinematics module 412 may lead to an associated control of the movement controller 414 by the inverse kinematics component 412.

In addition, or as an alternative, to the QoC level-specific setting of the control tolerance, in a further variant one or more PID parameters are adjusted dependent on the QoC level associated with a specific action or the corresponding command. As also illustrated in FIG. 4, the transmission controller 406 is configured to increase one or more PID parameters applied by the movement controller 414 in case of a low QoC action 410. In a similar manner, the transmission controller 406 is configured to decrease one or more PID parameters in case of a high QoC action 408. As such, a less aggressive PID parameter setting may be used for the implementation of high QoC actions 408 compared to the implementation of low QoC actions 410. Increasing, for example, the P parameter decreases the convergence time of the control, resulting in a faster execution of a movement path but with a higher overshooting and, thus, a lower accuracy. In some variants, the movement controller 414 may implement a P-based control only, meaning that the I and D parameters are not affected.

As has become apparent from the above, in one implementation the robot cell controller 106 is configured to control command execution by the robotic device 102 as follows. Initially, the order processor 402 obtains an action (via an order) that is to be performed by the robotic device 102 and determines the QoC level associated with the obtained action (see reference numerals 408 and 410 in FIG. 4). The order processor 402 then triggers a setting of at least one control parameter (e.g., the P parameter of a PID loop 416 and/or a goal tolerance parameter associated therewith) of the movement controller 414 for execution of a command pertaining to the action. This setting is dependent on the QoC level determined by the order processor 402 for the action. The corresponding control parameter will control one of the PID loops 416 that include a wireless transmission of the command to the robotic device 102 and of a feedback parameter detected by the sensor back to the movement controller 414.

If more than two QoC levels are defined, more than two associated PID parameter settings and and/or control tolerance settings may be defined as well. For example, there may exist one defined control tolerance setting for each of three or more QoC levels.

The technique presented herein may be implemented using a variety of robot programming tools and languages. For example, the robot programming language may be based on C++.

As has become apparent from the above exemplary embodiments, the technique presented herein permits to more efficiently use wireless transmission resources by intentionally relaxing transmission parameter settings for robot control actions that are less sensitive to delays. By properly selecting the control actions for which the transmission parameter setting can relaxed, the overall performance of the robot cell 101 will not be negatively affected. As such, the same level of overall robot cell performance can be realized at a lower utilization of wireless resources.

Additionally, legacy communication protocols, in particular those previously used in wire-based control systems, can remain unchanged. As such, a cost effective and efficient solution for the transition from wire-based to wireless command transmission technologies in industrial environments can be realized.

As has also become apparent from the above description, the present disclosure suggests a switching between transmission channels providing different levels of QoS depending on the different QoC requirements associated with different commands. In this way, differentiated data services may be provided to support varying QoC requirements.

Simulations have yielded that with the suggested approach, approximately 54% of radio time can be saved without affecting the productivity of the robot cell 101. A "super-effect" of the suggested approach is that the total processing time is decreased by 13% (to 87%) compared to conventional approaches.

While the present disclosure has been described with reference to exemplary embodiments, it will be appreciated that the present disclosure can be modified in various ways without departing from the scoop of the present disclosure as defined in the appended claims.

The invention claimed is:

1. A controller for controlling wireless command transmission to a robotic device, comprising: a processor; and
a memory coupled to the processor;
wherein the processor is configured to:
obtain an action that is to be performed by a robotic device;
determine a quality of control (QoC) level associated with the action, wherein the QoC level is indicative of a Key Performance Indicator (KPI) requirement for execution of a command pertaining to the action; and
trigger a setting of at least one transmission parameter for a wireless transmission of the command pertaining to the action, wherein the setting is dependent on the QoC level determined for the action, wherein a proportional-integral-derivative control loop for the robotic device is provided, and wherein the controller is configured to control one or more parameters of the proportional-integral-derivative control loop dependent on the QoC level determined for the action.

2. The controller of claim 1, wherein the processor is further configured to:
determine a control tolerance setting for the robotic device dependent on at least one of the action, the associated QoC level, the associated command and the associated transmission parameter setting; and
trigger application of the determined control tolerance setting for execution of the command.

3. The controller of claim 2, wherein
the control tolerance setting relates to a control tolerance of at least one of a movement goal path, a movement goal position, and a movement goal time.

4. The controller of claim 2, wherein
the control tolerance setting pertains to an inverse kinematics-based control.

5. The controller of claim 2, wherein the control tolerance setting is configured to influence the proportional-integral-derivative control loop.

6. The controller of claim 2, wherein
the control tolerance setting determined for execution of the command belongs to one of multiple control tolerance settings, wherein the determined QoC level belongs to one of multiple QoC levels, and wherein a control tolerance setting pertaining to a higher control tolerance is associated with a QoC level pertaining to a lower QoC.

7. The controller of claim 1, wherein
the obtained action belongs to at least one of multiple QoC levels associated with different KPI requirement levels for the robotic device.

8. The controller of claim 2, wherein the setting of the at least one transmission parameter is defined by at least one of:
an associated transmission resource consumption level; and
an associated Quality of Service (QoS) level of a wireless transmission channel.

9. The controller of claim 7, wherein
a KPI requirement level pertaining to a lower KPI requirement corresponds to at least one of a lower transmission resource consumption level and a lower QoS level.

10. The controller of claim 2, wherein the robotic device comprises a robot arm, and wherein the command relates to a movement of the robot arm.

11. The controller of claim 10, wherein the robot arm comprises multiple independently actuatable joints, and wherein the command comprises two or more sub-commands for actuation of different ones of the actuatable joints.

12. The controller of claim 2, wherein the controller is implemented using cloud computing resources.

13. The controller of claim 2, wherein
the transmission parameter setting is based on QoS control in accordance with the 3rd Generation Partnership Project Technical Specification 3GPP TS 23.501.

14. A method of controlling wireless command transmission to a robotic device, the method comprising:
obtaining an action that is to be performed by a robotic device;
determining a quality of control (QoC) level associated with the action, wherein the QoC level is indicative of a Key Performance Indicator (KPI) requirement for execution of a command pertaining to the action; and
triggering a setting of at least one transmission parameter for a wireless transmission of a command pertaining to the action, wherein the setting is dependent on the QoC level determined for the action, wherein a proportional-integral-derivative control loop for the robotic device is provided, and controlling one or more parameters of the proportional-integral-derivative control loop dependent on the QoC level determined for the action.

15. A non-transitory computer-readable medium having stored thereon computer-executable instructions that, when executed by a computer, cause the computer to execute operations, the operations comprising:
obtaining an action that is to be performed by a robotic device;
determining a quality of control (QoC) level associated with the action, wherein the QoC level is indicative of a Key Performance Indicator (KPI) requirement for execution of a command pertaining to the action; and
triggering a setting of at least one transmission parameter for a wireless transmission of the command pertaining to the action, wherein the setting is dependent on the QoC level determined for the action, wherein a proportional-integral-derivative control loop for the robotic device is provided, and controlling one or more parameters of the proportional-integral-derivative control loop dependent on the QoC level determined for the action.

16. A non-transitory computer-readable medium having stored thereon computer-executable instructions that, when executed by a computer, cause the computer to execute operations, the operations comprising:
obtaining an action that is to be performed by a robotic device;
determining a quality of control (QoC) level associated with the action, wherein the QoC level is indicative of a Key Performance Indicator (KPI) requirement for execution of a command pertaining to the action; and
triggering a setting of at least one transmission parameter for a wireless transmission of the command pertaining to the action, wherein the setting is dependent on the QoC level determined for the action.

* * * * *